United States Patent [19]

Bingaman et al.

[11] Patent Number: 4,577,790

[45] Date of Patent: Mar. 25, 1986

[54] TAPE LOOP BIN CONTROL SYSTEM

[75] Inventors: Barrett P. Bingaman, Burbank; Richard G. Krum, Thousand Oaks; James R. Williams, Sun Valley, all of Calif.

[73] Assignee: Cetec Corporation, El Monte, Calif.

[21] Appl. No.: 726,404

[22] Filed: Apr. 23, 1985

[51] Int. Cl.[4] .................... B65H 20/24; G11B 15/58
[52] U.S. Cl. ........................ 226/118; 226/4; 226/7; 226/108; 226/111; 242/182
[58] Field of Search ............... 226/108–111, 226/118, 119, 97, 4, 7; 242/182, 183, 184, 185, 186; 360/71, 93–96.1

[56] References Cited

U.S. PATENT DOCUMENTS

| | | | |
|---|---|---|---|
| 3,340,369 | 9/1967 | Seidl | 360/93 |
| 3,493,948 | 2/1970 | Ironside et al. | 340/174.1 |
| 3,499,589 | 3/1970 | Johnson et al. | 226/97 |
| 3,528,593 | 9/1970 | Armstrong et al. | 226/97 |
| 3,543,983 | 12/1970 | Dale et al. | 226/118 |
| 3,633,807 | 1/1972 | Williams | 226/97 |
| 3,693,859 | 9/1972 | Nielsen | 226/118 |
| 3,698,723 | 10/1972 | Kobler et al. | 226/118 X |
| 3,752,379 | 8/1973 | Di Padova et al. | 226/119 |
| 4,000,516 | 12/1976 | Watanabe et al. | 360/71 |
| 4,127,225 | 11/1978 | King | 226/118 |
| 4,128,198 | 12/1978 | Woodley | 226/97 |
| 4,387,843 | 6/1983 | Rehklau | 226/118 |
| 4,394,951 | 7/1983 | Ruda et al. | 226/118 |
| 4,474,321 | 10/1984 | Komoto et al. | 226/113 |

Primary Examiner—Leonard D. Christian
Attorney, Agent, or Firm—Harris, Kern, Wallen & Tinsley

[57] ABSTRACT

A control system for operating two magnetic tape loop bins in series with a continuous tape having an end of tape marker, including guides and drive rollers or capstans for guiding a tape from the first bin to the second bin and from the second bin past a magnetic head station to the first bin. End of tape sensors are positioned between the first and second bins and between the second and first bins to provide signals when tape markers pass the respective sensors. Each bin is provided with a tape drive motor and a motor control, with one motor being driven to provide about a constant tape tension and with the other motor being driven at a controlled speed which varies as a function of an error signal determined from the tape marker sensors.

9 Claims, 3 Drawing Figures

4,577,790

TAPE LOOP BIN CONTROL SYSTEM

BACKGROUND OF THE INVENTION

This invention relates to tape handling, and in particular to the tape transports which are used in the audio magnetic tape industry for making copies of master tapes.

Typically a master tape in the order of 1000 feet in length is spliced end to end to form an endless loop of tape which is continuously driven past a magnetic read head for transferring audio information from the master tape in the master unit to blank tapes in one or more slave units. Tape handling devices of this nature are shown in U.S. Pat. Nos. 3,608,798 and 3,528,593. Precise control of the speed of the master tape past the read head is desired, and one drive system for the capstan drive at the read head is shown in U.S. Pat. No. 4,431,950. An improved construction for read and write heads is shown in U.S. Pat. No. 4,470,084, and a reel hub configuration used in feeding tapes into and out of the apparatus is shown in U.S. Pat. No. 4,432,506.

In a typical tape transport, the major portion of the master tape is stored in a loop bin, with tape being fed in at one end of the bin and removed from the other end of the bin for passing the capstan drives and read and/or write heads at the magnetic head station. The storage bins are used in both horizontal and vertical configurations, as shown in the aforementioned U.S. Pat. Nos. 3,608,798 and 3,528,593.

The maximum length of master tape which present day loop bins can handle is in the order of 1200 to 1800 feet, with the limitation being primarily due to the bulk of tape which needs to be contained in the bin. At the same time, there often is a need for capability to handle master tapes of substantially greater length. The aforementioned U.S. Pat. No. 3,528,593 proposes arranging a plurality of film feeding devices in edge to edge relation so that the length of tape stored can be increased, but gives no details of how this may be accomplished.

It has been determined that one cannot merely connect two or more of the endless loop tape bins in series for obtaining higher tape storage capacity because the smallest unbalances in the tape drive speeds in the various bins results in most of the tape concentrating in one bin with little or no tape in the other. This is a serious problem, since the master tape typically is operated continuously for many hours during a slave tape production operation. When the master tape is operated at high speed for many hours, very small differences in the dimensions of the drive components and the speed of the drive motors will produce major unbalances in tape storage conditions.

Accordingly, it is an object of the present invention to provide a new and improved control system for operating tape loop bins in series to maintain balance of the quantities of tape in each of the bins.

A further object is to provide such a control system including means for measuring the amount of tape in each bin, means for comparing the resultant measurements, and means for changing the drive speed for one of the bins to reduce the differences.

It is an additional object of the present invention to provide a control system for operating two magnetic tape loop bins in series, which control system can be utilized with the other controls of a tape loop bin for the necessary steps of loading the tape and unloading the tape, and also for use of the two bins independently when smaller master tapes are being copied. An additional object is provide such a control system which can be operated in conjunction with the conventional constant tape tension control systems.

Other objects, advantages, features and results will more fully appear in the course of the following description.

SUMMARY OF THE INVENTION

The control system of the invention provides for operating two magnetic tape loop bins in series with a continuous loop of tape. The system includes a guide configuration of guides and rollers or capstans for guiding the tape from the first bin to the second bin and from the second bin past a magnetic head station to the first bin, including tape drive motors for each of the bins. This system also includes means for measuring the amount of tape in each of the bins to provide bin signals, and an error signal computer means having the bin signals as inputs to provide an error signal output varying as a function in the differences in the bin signals, for controlling at least one of the tape drive motors.

The preferred embodiment of the system incorporates an end of tape sensor between the first and second bins and another end of tape sensor between the second and first bins for providing signals to the error signal computer means. Preferably, one of the motors is driven at about a constant speed, typically at a speed to provide substantially constant tape tension, while the other motor is driven at a controlled speed which varies as a function of the error signal.

DESCRIPTION OF THE PREFERRED EMBODIMENT

Figure 1:
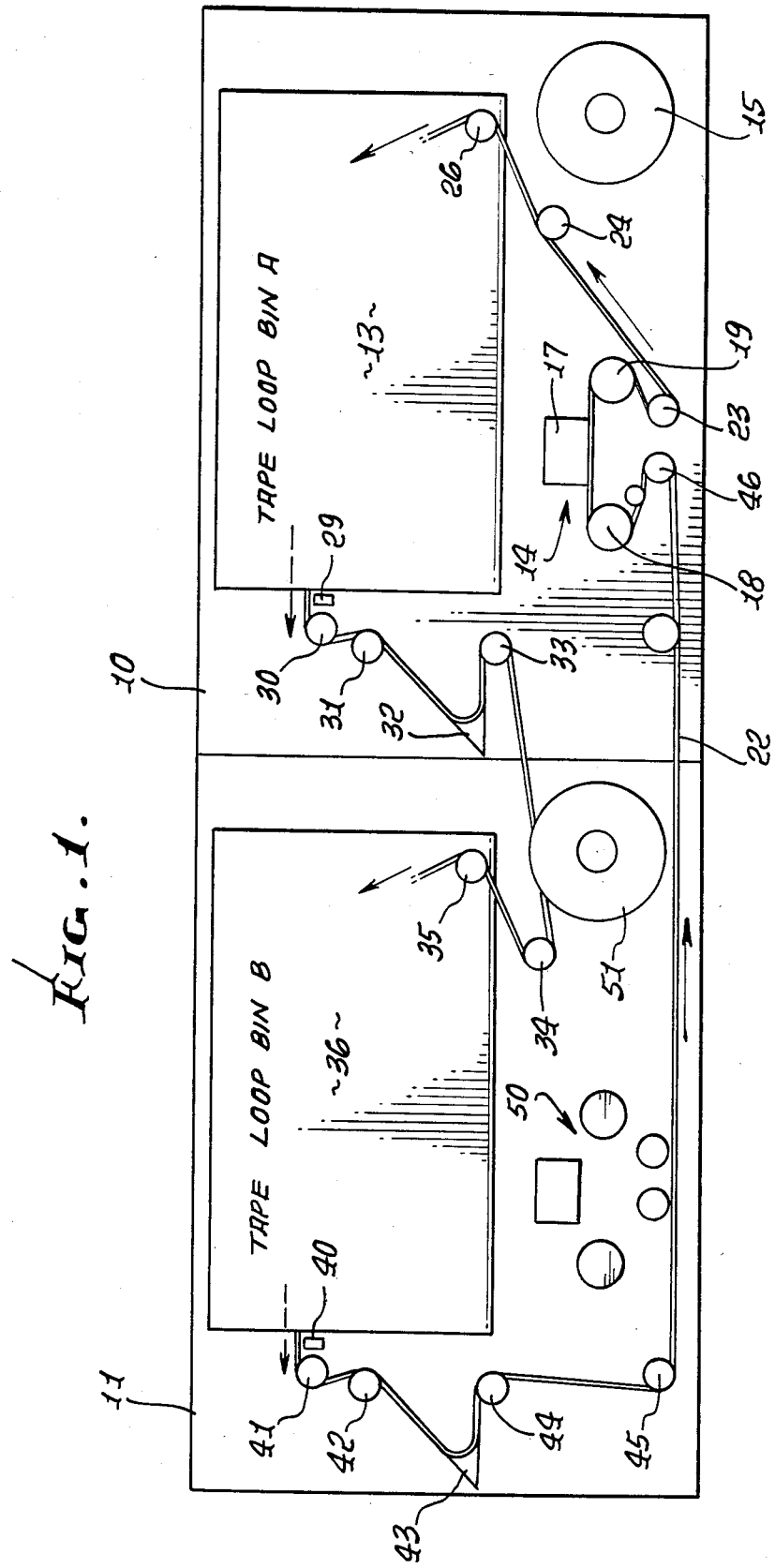
FIG. 1 is a view showing two tape transport plates or tables with tape loop bins positioned side by side and incorporating the presently preferred embodiment of the invention.

Referring to FIG. 1 two tape transport plates or tables 10, 11 are positioned adjacent to one another. The two tables may be identical with one exception to be described below. Table 10 includes a tape loop bin 13, a magnetic head station 14, and a tape reel 15. The loop bin may be conventional, such as it is shown in the aforesaid U.S. Pat. No. 3,608,798. The magnetic head station 14 includes a magnetic head 17, an incoming tape drive capstan 18, and an outgoing tape drive capstan 19, and typically may have the configuration shown in the aforesaid U.S. Pat. No. 4,431,950. The reel 15 is utilized for initially loading a tape into the equipment, and for finally unloading the tape from the equipment, and typically may have the configuration shown in the aforesaid U.S. Pat. No. 4,432,506.

In the embodiment illustrated in FIG. 1, a length of tape 22 has been loaded into the two tables 10, 11 and has been spliced end to end to form an endless loop. As shown, the tape leaves the outgoing drive capstan 19, passes around guides or guide spindles 23, 24, and is driven into the bin 13 by a drive capstan 26.

On leaving the bin 13, the tape passes an end of tape sensor 29 and moves past the guides 30, 31 into a vacuum chamber 32, and then past guides 33, 34, to another drive capstan 35 at the input to bin 36 on table 11. The vacuum chamber 32 is a conventional unit which functions to provide a constant tension in the tape at the inlet to the bin 36.

The tape follows a similar path on leaving bin 36, passing another end of tape sensor 40, guide rollers 41, 42, vacuum chamber 43, and guides 44, 45 and 46, back to the magnetic head station 14.

The table 11 also has a magnetic head station 50 and tape reel 51 which are used when the table 11 is operated independently of the table 10.

Each of the bin drive capstans 26 and 35 is driven by a motor, and each motor has a motor control system which functions to drive the tape at about a constant speed, typically at a substantially constant tape tension, when the bins are operated separately. When the bins are operated in series as shown in FIG. 1, one of the motors is operated in the conventional manner and the other is operated in a new controlled manner. In the embodiment illustrated, the motor for the capstan 26 for bin 13 is operated in the constant tension mode and the motor for the capstan 35 for bin 36 is operated in the different controlled mode.

Figure 2:
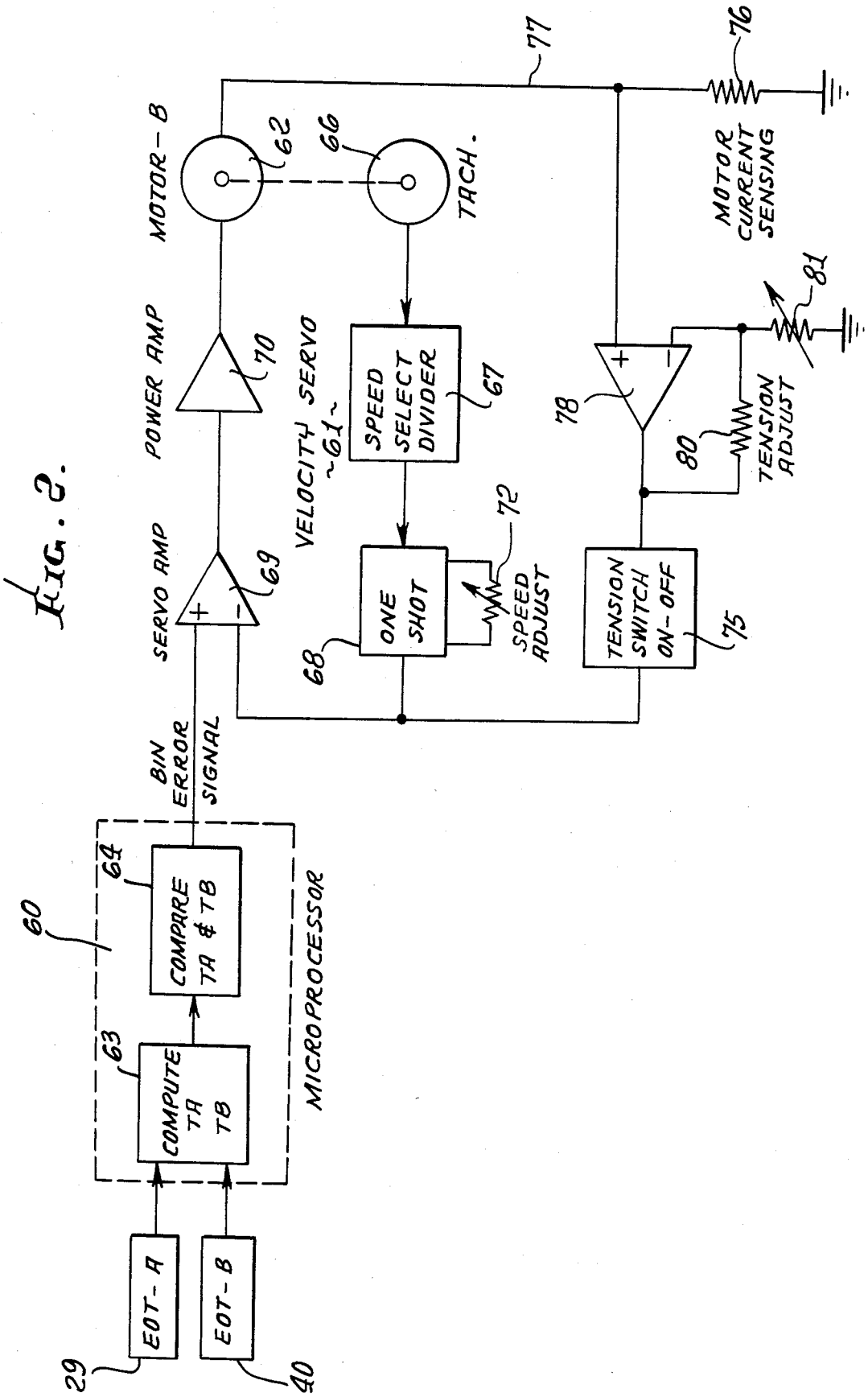
FIG. 2 is an electrical block diagram of the tape drive motor control circuit for the system of FIG. 1.

The drive circuit for the motor for the controlled capstan 35 is shown in FIG. 2. The master tapes used in these tape reproducing devices includes some form of marker to identify the end of the tape for operational purposes, and the end of tape (EOT) sensors 29, 40 function to provide an electrical signal when this marker passes the sensor. The signals from the end of tape sensors are connected as inputs to a microprocessor 60 which provides a bin error signal as an input to a velocity servo 61 which includes a motor 62 for driving the capstan 35. The microprocessor includes means for computing the elapsed time for the tape marker to pass through bin A and to pass through bin B, indicated at 63, with the elapsed times being TA and TB. In its simplest arrangement, TA is merely the time required for the tape marker to move from sensor 40 to sensor 29, and TB is the time required for the marker to move from sensor 29 to sensor 40. If desired, the time required for the tape to pass the head station 14 may be included in the computation, but this time ordinarily is very small compared with the time required for the tape to pass through each of the bins.

The microprocessor also provides for comparing and determining the difference between the two elapsed times, with the error signal being a function of this difference, as indicated at 64.

The diagram of FIG. 2 illustrates how the bin drive motor 62 is operated in the constant tension mode and in the controlled speed mode. The motor 62 drives a tachometer 66 which provides an electrical output varying as a function of the speed of the motor. The output from the tachometer is connected to a speed select divider 67 with its output driving a one shot multi-vibrator 68, which provides a varying time square wave pulse output to a servo amplifier 69. The output of the servo amplifier provides the input to a power amplifier 60 which in turn drives the motor 62. The other input to the servo amplifier 69 is the bin error signal, which also is a time modulated square wave in the preferred embodiment.

Typically tape loop bins are driven at one of two or three nominal speeds, which is set by the operator prior to initiation of a run. Setting the desired nominal speed actuates the speed select divider 67 to provide the desired output. Adjustment of the actual speed about the nominal set value may be accomplished by a variable resistor 72 in the one shot multi-vibrator 68. The feedback loop from the motor through the tachometer, speed select divider, one shot, and servo amplifier functions in the normal manner of a velocity servo to operate the motor at a constant speed. However, the actual speed of the motor is varied by the bin error signal so that, when bin B has less tape than bin A, the motor is speeded up and when bin B has more tape than bin A, the motor is slowed down.

As stated previously, the motor 62 may also be operated in the constant tension mode by actuation of a tension switch 75 from the off position to the on position. A resistor 76 is positioned in the motor line 77 and provides a signal as an input to an operational amplifier 78, which signal varies as a function of motor current and hence tape tension. The amplifier 78 has a feedback resistor 80 and a variable resistor 81 connected to circuit ground, with the variable resistor providing for manual adjustment by the operator of the desired tape tension.

When the tension switch 75 is in the off position, the amplifier 78 is out of the circuit and the motor 62 is operated at the controlled speed for balancing the amount of tape in each of the bins. When the tension switch 75 is turned on, the output from the amplifier 78, having more gain, overrides the signal from the tachometer and drives the motor 62 to provide a substantially constant tension in the tape.

The two tape transport tables 10, 11 may be operated in various modes. When using shorter master tapes, one table can be used for reproducing while a master tape is unloaded from a new master tape loaded into the other table. Each of the tables can be used independently of the other for reproducing tapes. Then when it is desired to utilize a longer tape, the two tables are operated in series as illustrated and described above, using only one of the head stations. It will be recognized that the various components can be rearranged, such as by utilizing the head station of bin B rather than that of bin A. Also, the locations of the end of tape sensors can be varied and more than one tape marker can be utilized.

After a long tape has been loaded and the recording run is started, the servo motor for the bin 13 runs in its constant tension mode and the servo motor for the bin 36 runs in the controlled speed mode. In the controlled speed mode, the run time of the tape in each bin is monitored by the end of tape sensors, and the speed for the motor for the bin 36 is corrected in a manner to maintain substantially equal lengths of tape in each loop bin.

Figure 3:
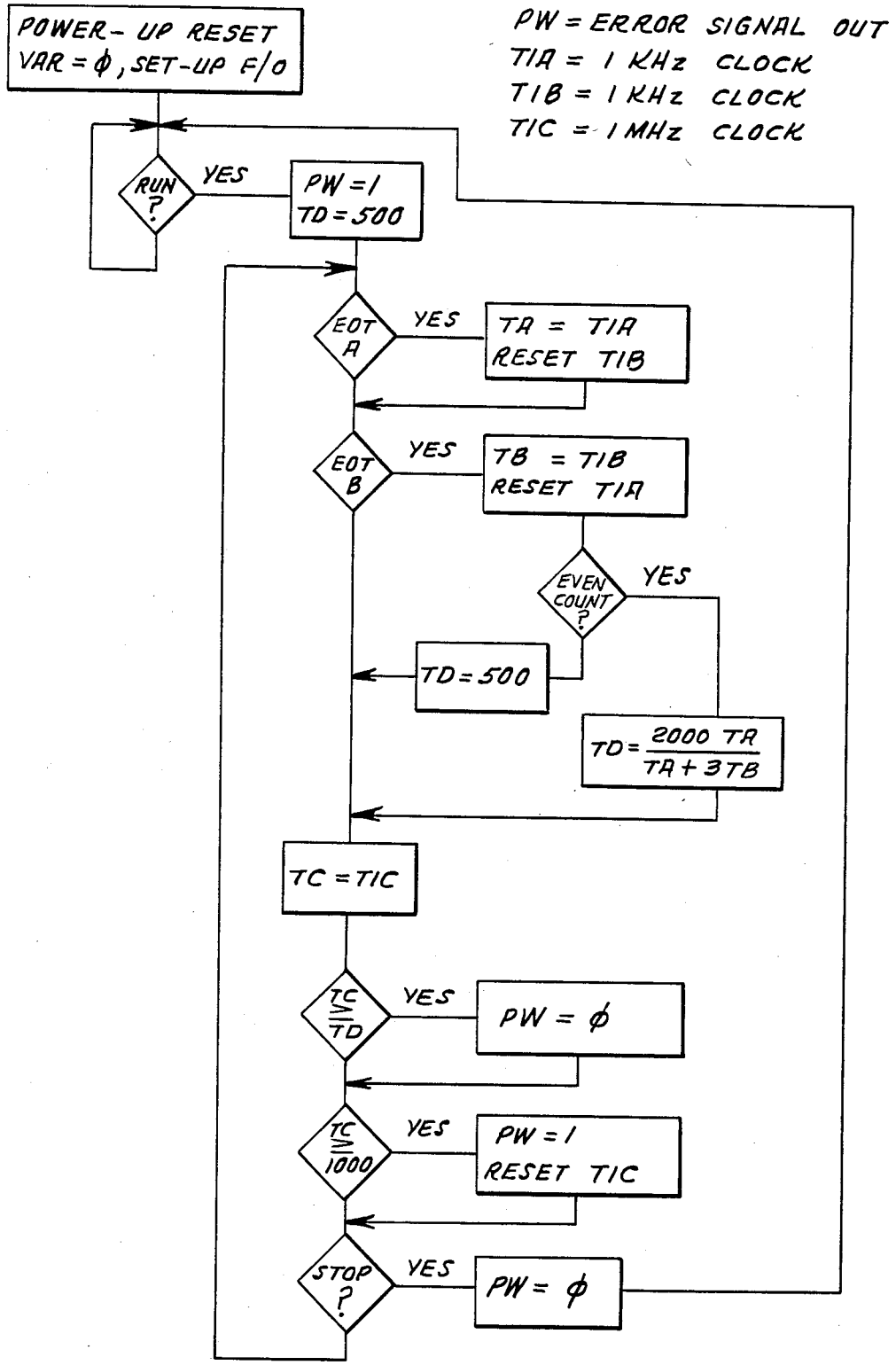
FIG. 3 is a flow chart for the operation of the apparatus of FIGS. 1 and 2.

The flow chart of FIG. 3 shows one process by which the bin error signal for the servo amplifier 69 can be calculated. This error signal provides a symmetry modulated pulse width drive.

PW is the pulse width output for the bin error signal.
TIA is a resettable 1 KHz clock with a binary output.
TIB is a resettable 1 KHz clock with a binary output.
TIC is a resettable 1 MHz clock with a binary output.
TA, TB, TC and TD are variables.
Run and Stop are functions controlled by mode switches in the processor.
EOT-A is the end of tape sensor at the exit of bin A.
EOT-B is the end of tape sensor at the exit of bin B.

After Power-up Reset, at which time the variables are set to zero and I/0 is set up, the system runs in loop waiting for Run status. If Run status is yes, PW is set to 1 and TD is set to 500. Then check for EOT-A, check for EOT-B, set TC equal to TIC, check TC greater than or equal to TD, check TC greater than or equal to 1000, check for Stop. If Stop, set PW to 0 and return to top of loop, otherwise return to check EOT-A. Assuming no Stop or EOT inputs, the loop will run until TC is equal to or greater than TD. At that time PW is set to 0 and the loop continues until TC is equal to or greater than 1000. At that time PW is set to 1 and TIC is reset. The loop continues alternating PW from 1 to 0 and back again until a new input is received. This produces a 50% duty cycle square wave at the output PW, thereby driving the motor 62 at nominal speed.

When EOT-A is received, TA is set equal to TIA, and TIB is reset, and the loop continues to run as described above. When EOT-B is received, TB is set equal to TIB, and TIA is reset. On odd counts of EOT-B, TD is set to 500, and the loop continues as above. This is done to prevent invalid values for TA and TB in the first tape loop pass after start-up, particularly in case the bins were started with the end of tape at a point other than normal, which is close to the head assembly. When an even count EOT-B is received, the values of TA and TB are used to calculate the value of TD. The value of TD determines the symmetry of the square wave output, PW. Values of TD less than 500 produce a duty cycle of less than 50 percent while values greater than 500 produce a duty cycle of greater than 50 percent; TD=500 generates nominal drive speed.

The tape loop continues at the corrected drive speed until an odd count EOT-B is received at which time TD is set to 500 and the drive returns to nominal speed so that it can receive new valid values for TA and TB. The loop now continues to produce new values for TA and TB while running at nominal speed on even EOT-B counts and driving at the corrected speed on EOT-B odd counts until a stop input is received. At that time PW is set to zero, drive to off, and the loop returns to the power-up condition, monitoring for a Run input.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim:

1. In a control system for operating two magnetic tape loop bins in series with a continuous tape having an end of tape marker, the combination of:
   guide means for guiding a tape from a first bin to a second bin and from said second bin past a magnetic head station to said first bin;
   a first end of tape sensor positioned between said first and second bins, and providing a first signal when an end of tape marker passes said first sensor;
   a second end of tape sensor positioned between said second and first bins, and providing a second signal when an end of tape marker passes said second sensor;
   first and second tape drive motors for driving tape through said first and second bins, respectively;
   a first motor control for one of said drive motors for driving a tape at about a constant tension;
   a second motor control for the other of said drive motors for driving tape at a controlled speed which varies as a function of an error signal;
   error signal computer means having said first and second signals as inputs and providing as an output, an error signal which varies as a function of the differences in time for said tape marker to move from said first sensor to said second sensor, and from said second sensor to said first sensor; and
   means for connecting said error signal to said second motor control.

2. A system as defined in claim 1 wherein said second motor control includes a velocity servo having
   a tachometer driven by said second motor to provide a motor speed signal,
   a speed select circuit for setting a desired tape speed and having said motor speed signal as an input and providing a selected signal as an output,
   feedback signal generator means having said selected signal as an input and providing a feedback signal as an output,
   a servo amplifier having said error signal and feedback signal as inputs, and
   a power amplifier having said servo amplifier output as an input and providing an output to said second motor.

3. A system as defined in claim 2 wherein said error signal computer means includes
   means having said first and second signals as inputs for determining the elapsed time between first and second signals and between second and first signals to provide first and second times, and
   means having said first and second times as inputs for determining the difference therebetween and providing as an output an error signal varying as a function of the difference of one of said times for the other of said times.

4. A system as defined in claim 3 wherein said second motor control includes a tape tension control having
   means for sensing current of said second motor and providing a current signal,
   a current sense amplifier having said current signal and a tension reference signal as inputs and providing a tape tension signal as an output, and
   switch means for connecting said tape tension signal to said servo amplifier in parallel with said feedback signal.

5. A system as defined in claim 2 wherein said second motor control includes a tape tension control having
   means for sensing current of said second motor and providing a current signal,
   a current sense amplifier having said current signal and a tension reference signal as inputs and providing a tape tension signal as an output, and
   switch means for connecting said tape tension signal to said servo amplifier in parallel with said feedback signal.

6. A system as defined in claim 1 wherein said error signal computer means includes
   means having said first and second signals as inputs for determining the elapsed time between first and second signals and between second and first signals to provide first and second times, and
   means having said first and second times as inputs for determining the difference therebetween and providing as an output an error signal varying as a function of the difference of one of said times for the other of said times.

7. In a control system for operating two magnetic tape loop bins in series with a continuous tape having an end of tape marker, the combination of:
   guide means for guiding a tape from a first bin to a second bin and from said second bin past a magnetic head station to said first bin;

a first end of tape sensor positioned between said first and second bins, and providing a first signal when an end of tape marker passes said first sensor;

a second end of tape sensor positioned between said second and first bins, and providing a second signal when an end of tape marker passes said second sensor;

first and second tape drive motors for driving tape through said first and second bins, respectively;

a first motor control for one of said drive motors for driving a tape at substantially constant tension; and a second motor control for the other of said drive motors for driving tape at a controlled speed to maintain substantially the same amount of tape in each of said bins.

8. In a control system for operating two magnetic tape loop bins in series with a continuous tape having an end of tape marker, the combination of:

guide means for guiding a said for a first bin to a second bin and from said second bin past a magnetic head station to said first bin;

first and second tape drive motors for driving tape through said first and second bins, respectively;

first means for measuring the amount of tape in said first bin to provide a first bin signal;

second means for measuring the amount of tape in said second bin to provide a second bin signal;

error signal computer means having said first and second bin signals as inputs and providing as an output, an error signal which varies as a function of the difference in said bin signals; and third means for connecting said error signal to one of said drive motors in controlling relation.

9. A method for operating two magnetic tape loop bins in series with a continuous tape having an end of tape marker, with each loop bin having a drive motor, including the steps of:

guiding a tape from a first bin to a second bin and from the second bin past a magnetic head station to the first bin;

detecting passage of the end of tape marker between the first and second bins and providing a first signal;

detecting passage of the end of tape marker between the second and first bins and providing a second signal;

determining an error signal as a function of the differences in time for the tape marker to move from the first bin to the second bin, and from the second bin to the first bin controlling one of the drive motors to drive the tape at about a constant tension; and controlling the other of the drive motors to drive the tape at a controlled speed which varies as a function of the error signal.

* * * * *